May 5, 1942.    C. F. QUENTIN ET AL    2,282,147
FISHLINE DRYING MEANS
Filed Feb. 3, 1940    2 Sheets-Sheet 2
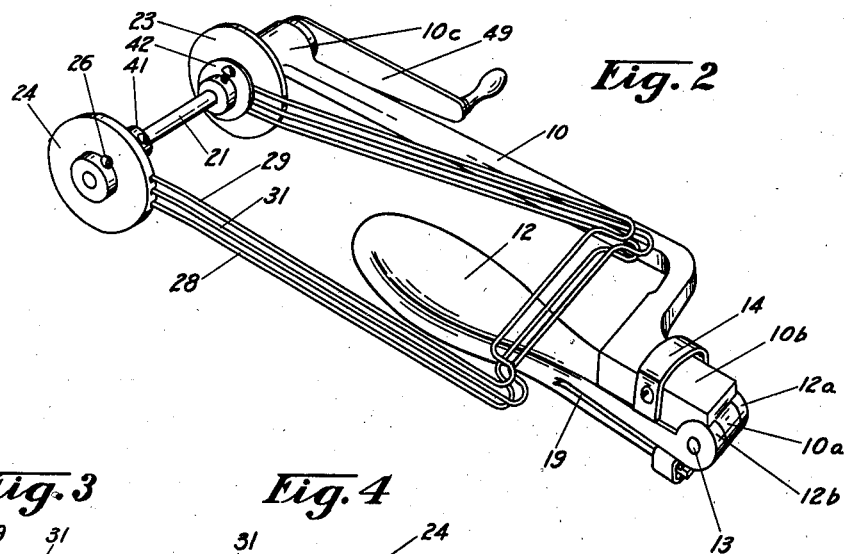
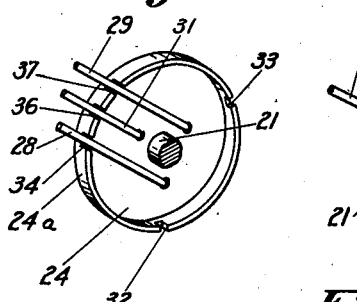
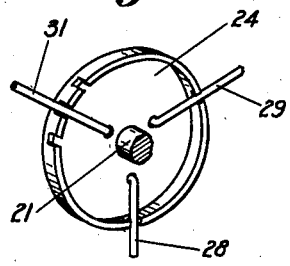
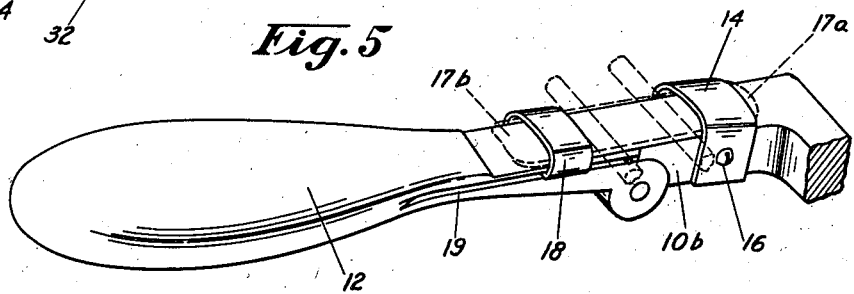
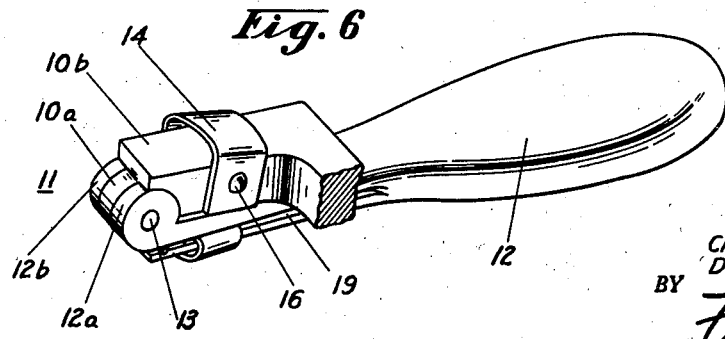
INVENTOR.
CHARLES F. QUENTIN
DONALD E. KASSNER
BY
*Flournoy Corey*
ATTORNEY.

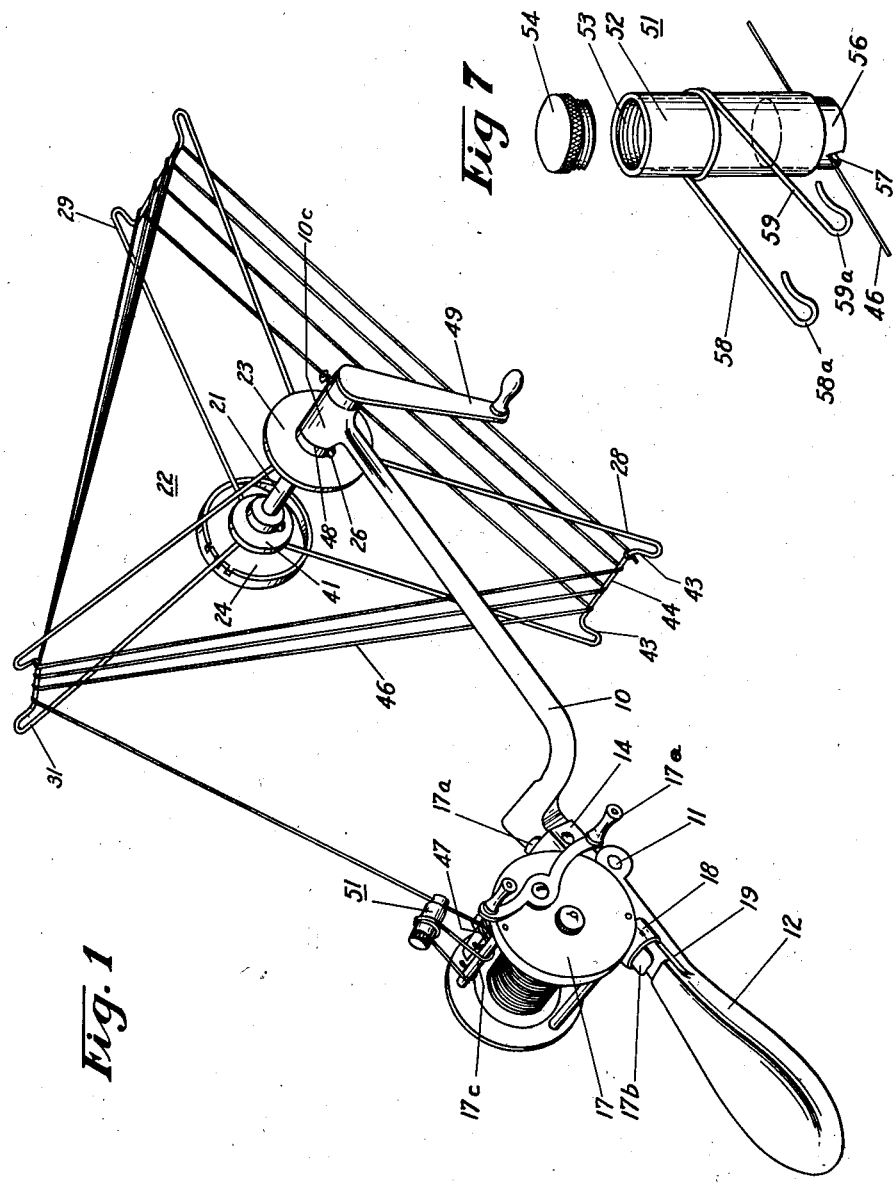

Patented May 5, 1942

2,282,147

UNITED STATES PATENT OFFICE 2,282,147

FISHLINE DRYING MEANS

Charles F. Quentin, Cedar Rapids, and Donald E. Kassner, Marion, Iowa

Application February 3, 1940, Serial No. 317,186

5 Claims. (Cl. 242—104)

This invention relates to a fish line drying and treating means, and has particular relation to a drying and treating means in which the fish line is reeled from a fishing reel onto a large drying reel so that the relatively few turns of the line are spaced from one another to permit ready drying of the line by exposure to the atmosphere.

Some general objects of our invention are to provide a new, improved, practical, light, and usable line drying and treating means which shall be simple in construction, reliable, and easily manipulated in operation, and of pleasing appearance.

An important object of our invention is the provision of an apparatus of the above character which may be folded into extremely small compass so that it may be readily carried in a tackle box or the like.

Another object of our invention is to provide means for utilizing the traversing winding mechanism of a reel to distribute the line on the drying reel.

Still another object of our invention is to provide a device having a folding handle and in which the reel and the means for fastening the reel to the handle serve also to hold the handle in operative position.

Another object of our invention is to provide means for permitting the folding of the drier reel into a small space.

Still another object of our invention is to provide means cooperating with the fishing reel and the drying reel for treating the line as it is wound and unwound from the drier reel.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In said drawings:

Figure 1 illustrates a line drying and line treating structure constructed according to one embodiment of our invention as it appears in use.

Figure 2 illustrates the device as it appears when folded for stowing away in a tackle box or the like.

Figure 3 is a fragmentary view in perspective showing how the drier reel is collapsed to the position shown in Figure 2.

Figure 4 is also a fragmentary view in perspective illustrating how the drier reel is located and held in the operative position shown in Figure 1.

Figure 5 is a fragmentary view in perspective of the handle and fishing reel attaching means illustrating how the fishing reel is employed for holding the handle in the extended or open position illustrated in Figure 1.

Figure 6 is a fragmentary view in perspective of the handle as it appears in the folded position shown in Figure 2, and Figure 7 is a view in perspective, in exploded relation, illustrating in greater detail the line treating device shown in Figure 1.

Referring now to the drawings:

A device constructed according to one embodiment of our invention includes an L-shaped frame or a single arm frame, illustrated at 10, pivotally engaged, as at 11, to a handle 12. The pivotal connection includes yoke-like members 12a and 12b, illustrated more particularly in Figures 2 and 6, on the handle 12, and a tongue-like member 10a on the frame 10. These are connected by means of a pivot pin 13.

A strap 14 is secured to the base 10b of the frame 10 as by means of bolts 16, and this strap is spaced from the base 10b to receive the tang or tongue 17a of the fishing reel 17. Another strap 18 is provided, the ends of which are slidably received in grooves 19 on opposite sides of the handle 12, and this strap 18 may be slid forward to receive the other tang 17b of the reel 17. It is apparent, on inspection of the drawings, that the tangs of the fishing reel are not only removably secured to the handle 12 and single arm base 10 by means of the straps 14 and 18, but that the tangs of the reel will hold the handle 12 in extended position with reference to the base frame 10 when the reel is properly secured on the handle.

The frame arm 10 is provided with an enlarged outer portion 10c which is transversely drilled to receive the shaft 21 of the drier reel 22. A pair of oppositely disposed disc-like members 23 and 24 are provided on opposite ends of the shaft 21, and these are secured to the shaft by means of set screws 26. Both of the discs 23 and 24 are drilled from the inside at three equally spaced points, as illustrated in Figure 3, to receive the outwardly turned ends of the fishing line support members 28, 29 and 31.

The disc 24 is provided with a flange 24a having five notches 32, 33, 34, 36 and 37 in the edge thereof. The notches 34, 36 and 37 are close together and are spaced apart only sufficiently that the wire supports 28, 29 and 31 will lie in approximately parallel planes when folded.

The notches 32 and 33 are spaced at approximately 120 degrees with the notch 36, so that when the wires 28 and 29 are swung around to the open position shown in Figures 1 and 4, the outwardly extending supports are spaced at approximately 120 degrees with respect to one another, as illustrated in Figure 1.

The inner ends of the wires are preferably "shrouded" or covered by means of other oppositely disposed small discs 41 and 42 so that they will not become dislodged by striking against other objects.

The support members 28, 29 and 31 are approximately U-shaped with the inner portions slightly closer together than the outer portions thereof, and the wire support members are preferably initially stressed so that the inner ends tend to spread apart. The outer portions of the wire supports are bent back upon themselves, as illustrated at 43, to provide a transversely extending portion 44 for receiving the line 46 as it is unwound from the fishing reel 17. The end of the line may be tied to one of the bent portions 43.

A crank handle 49 is provided, which is secured to the end of the shaft 21 projecting beyond the bearing 10c, and this crank handle readily rotates the drier reel in winding line from the fishing reel onto the drier reel.

In operation, the reel 17 is secured to the handle by means of the straps 14 and 18, the line is passed through the traversing winding guide member 47, and the free end of the line secured to the drier reel. The handle 49 is then rotated and the line will wind onto the reel 22. The traversing winding guide 47 will cause the line to be wound back and forth on the reel so that turns of the line are spaced from one another to permit ready drying.

A spring washer may be placed on the shaft 21 between the bearing 10c and the disc 23 at a point indicated at 48, which will apply a certain amount of friction to the drier reel to prevent it from moving too freely. The line is then wound onto the drier reel and the line drying device may be placed in any dry place so that the line may be thoroughly dried out.

When the line is dry, it may be reeled back on the fishing reel 17 by means of the winding crank 17a. When the line has been wound back on the fishing reel, the drying device may be folded to a small compass and stowed away.

We may employ the line drying means as a line treating means as well by providing a treating fluid container 51, as illustrated in Figures 1 and 7. The container consists of a cylinder 52 open at both ends and threaded at the upper inner wall, as illustrated at 53, to receive a threaded cap 54. The lower end of the cylinder 52 is closed by means of a cylindrical pad 56 of felt, or any like material which is sufficiently porous to permit oil or the like to pass slowly therethrough. The pad 56 is provided with a V-shaped notch in its lower face, as illustrated at 57, so that the line 46 may pass through the notch and be oiled or treated by oil or like materials placed in the space within the cylinder 52.

The treating device is preferably slidably engaged to the reel by means of a pair of hook members 58 and 59. The hook portions 58a and 59a are preferably hooked over the cross bar 17c of the reel 17, and may then slide back and forth on this cross bar so that the notch of the pad 56 may follow the line as it is wound and unwound from the drier reel. Of course the liquid in the pad is transferred to the line, and thus oil or like materials may be applied to the line for treating it as desired.

Although we have described a specific embodiment of our invention, it is apparent that modifications may be made by those skilled in the art. Such modifications may be made without departing from the spirit and scope of our invention as set forth in the appended claims.

We claim as our invention:

1. In combination, a frame, a line drying reel rotatably mounted thereon, a handle, means for hingedly mounting the handle on the frame, and means for detachably securing the base of a fishing reel on both the handle and frame contiguous to the hinge mounting means, said securing means adapted to hold the handle in extended position when the reel is mounted in place on the handle and frame.

2. In a line drying device, a frame, a drying reel rotatably mounted in one end thereof, a handle hingedly mounted on the other end thereof, the drying reel being foldable to permit it to lie in a plane with the frame and to one side of the axis of the drying reel, and means for demountably supporting a fishing reel on the handle and frame, said means including a pair of clips disposed on opposite sides of the hinge of the handle, at least one of said clips being slidably mounted, said means adapted to clamp the frame, the handle and reel together and hold the handle in extended position.

3. In a line drying device, a frame, a drying reel rotatably supported therein, a handle foldably attached to the frame, and means for supporting the handle in extended position, said means including a sleeve on the frame and a sleeve mounted for sliding movement on the handle, the first of said sleeves adapted to receive one end of the base of a fishing reel, the other of said sleeves adapted to be slidably engaged over the other end of the base of a fishing reel.

4. In a device of the character described, a frame member having a handle hingedly mounted at one end and an offset portion at the other end, a shaft rotatably mounted in the end of the offset portion, a pair of discs having inwardly flanged edges secured to the shaft for rotation therewith, and a plurality of wire-like, substantially U-shaped line-supporting members having outwardly turned ends, the discs having holes, spaced from the shaft and from each other, for receiving the out-turned ends, the flanged edges of the discs having similarly spaced notches radially spaced from the respective holes for normally securing the U-shaped line-supporting members in operative position, the said flanged portions also having additional notches spaced relatively close to one of the first mentioned notches for securing the U-shaped members in inoperative position closely parallel with one another, whereby all the U-shaped members may be positioned to lie within the offset portion of the frame member and the handle folded over to lie against the said U-shaped members.

5. In a device of the character described for use in conjunction with a fishing reel having mounting tangs, a folding handle, and means including looped strap-like members disposed on opposite sides of the break in the handle for securing the fishing reel to the folding handle, the tangs of the reel being adapted to be disposed on opposite sides of the break in the handle, and secured to the handle by sliding at least one of said strap-like members thereover, whereby when the reel is secured to the handle, the handle is held in open position.

CHARLES F. QUENTIN.
DONALD E. KASSNER.